Figure 3:
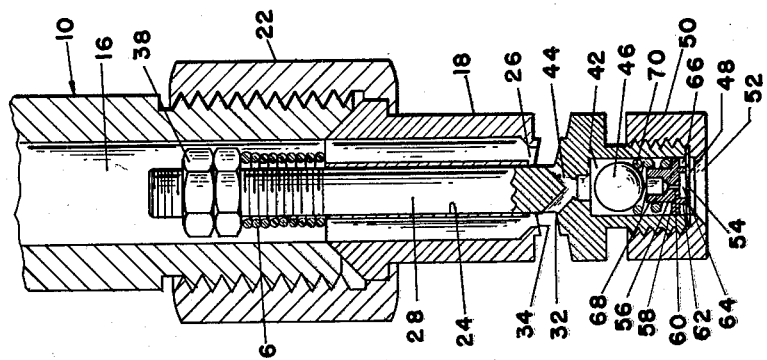

July 23, 1963    G. H. STRAM    3,098,610
BREAD PAN GREASING NOZZLE
Filed Nov. 13, 1961    3 Sheets-Sheet 1

INVENTOR.
GEORGE H STRAM
BY Otto Moeller
ATTORNEY

July 23, 1963  G. H. STRAM  3,098,610
BREAD PAN GREASING NOZZLE
Filed Nov. 15, 1961  3 Sheets-Sheet 2

INVENTOR.
GEORGE H. STRAM
BY *Otto Moeller*
ATTORNEY

July 23, 1963 G. H. STRAM 3,098,610
BREAD PAN GREASING NOZZLE
Filed Nov. 15, 1961 3 Sheets-Sheet 3

*INVENTOR.*
GEORGE H STRAM
BY *Otto Moeller*
ATTORNEY

United States Patent Office 3,098,610
Patented July 23, 1963

3,098,610
BREAD PAN GREASING NOZZLE
George H. Stram, Hellam, Pa., assignor, by mesne assignments, to Baker Perkins Inc., New York, N.Y., a corporation of New York
Filed Nov. 13, 1961, Ser. No. 151,634
6 Claims. (Cl. 239—441)

This invention relates to an improved spray nozzle, and more particularly to spray nozzles for use in greasing the side and bottom walls defining the cavities of bread pans.

Various types of machines are commonly employed in the baking industry for automatically greasing bread pans. Briefly, such machines include a conveyor for advancing successive bread pans, the pans passing beneath a grease distributor provided with a nozzle from which a metered amount of grease is automatically sprayed into each pan cavity as each pan cavity registers with the nozzle. In some types of such automatic pan greasers, the nozzle is fixed in position above the level of the upper edges of the pans, while in other types, as shown in Tench Patent Nos. 2,701,542, and 2,830,846, the nozzle is arranged to dip down into the pan cavity, and it should be understood that my improved nozzle may be used to advantage in either type of pan greaser.

Prior to the introduction of the continuous mix processing of dough, it was not necessary that the side walls and bottom surfaces be entirely sprayed with grease to preclude adherence of the baked loaf to the pan, in fact little or no grease was required on the bottom surface of the pans. However, doughs produced by continuous mix processing are of a more flowable consistency and considerable difficulty has been experienced in depanning the baked loaves due to sticking of the loaves in the pans.

The primary object of the present invention is to provide a spray nozzle that is simple in construction and efficient in operation to direct a spray of grease over substantially the entire inner surfaces of the upright walls and the bottom wall of a bread pan.

In certain prior art bread pan greasers atomization and dispersal of the grease to cover the entire inner surfaces of the bread pans has been effected by compressed air. However, such devices are objectionable in that they produce a cloud of atomized grease, a portion of which will escape to the ambient atmosphere leaving undesirable deposits of oil. Hydraulic type sprays of the prior art overcoming the objections to the pneumatic type sprays have not been entirely satisfactory where it is found to be important to provide a spray of grease over the entire inner surfaces of a bread pan. It is, therefore, an object of the present invention to provide a novel spray nozzle of the hydraulic type that effectively and uniformly coats the entire inner surfaces of a bread pan with a spray of grease.

These and other objects of the present invention will become apparent from the following detailed description and the accompanying drawings illustrating a preferred embodiment of the invention.

Figure 2:
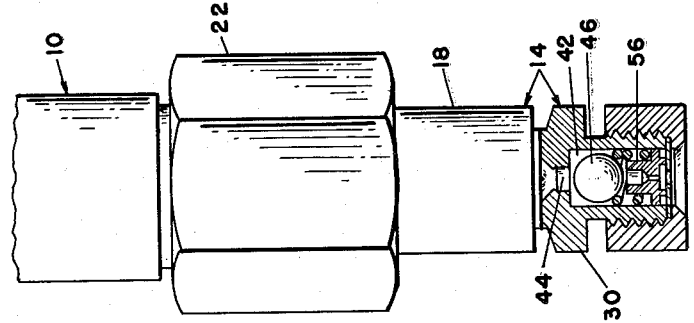
Figure 1:
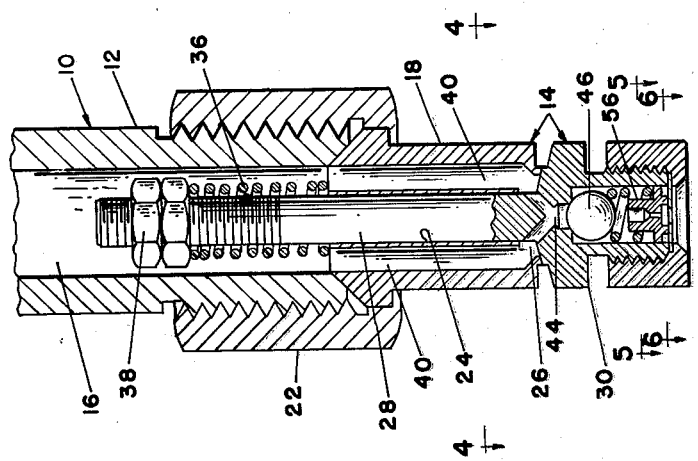
Figure 4:
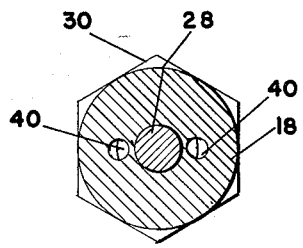
Figure 5:
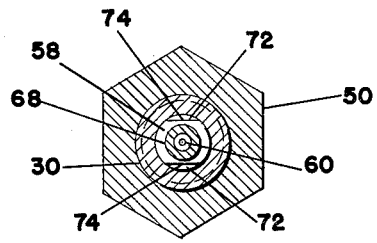
Figure 6:
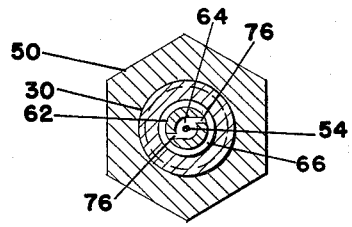
Figure 10:
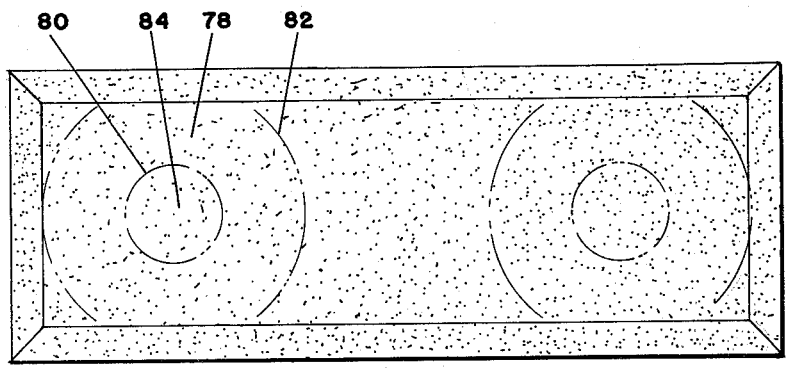
Figure 7:
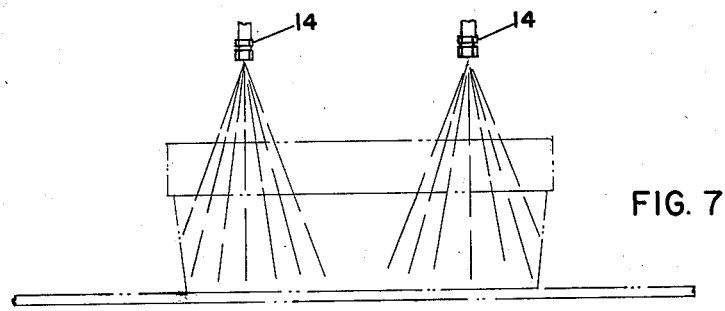
Figure 8:
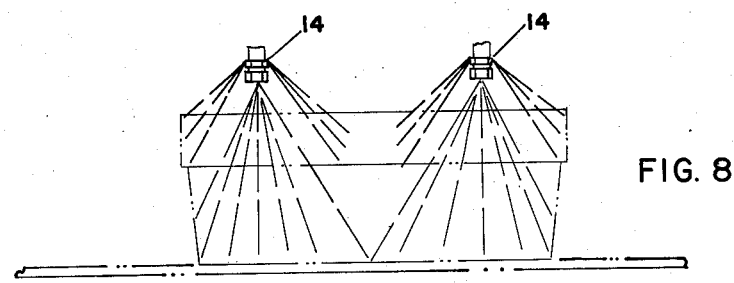
Figure 9:
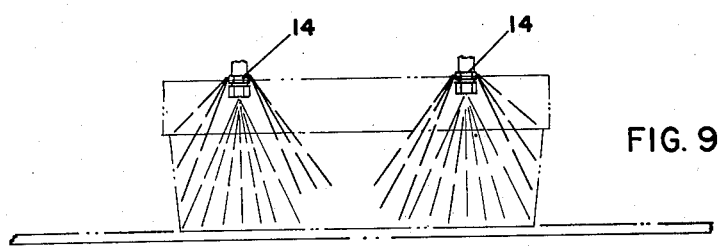

In the drawings:
FIGURE 1 is a vertical sectional view through the novel spray unit, in normal inoperative position;
FIGURE 2 is a vertical sectional view through the novel spray unit, parts being shown in elevation, showing the downwardly directed spray means in operative position;
FIGURE 3 is a vertical sectional view through the novel spray unit, showing both the laterally and downwardly directed spray means in operative position;
FIGURE 4 is a sectional view taken on line 4—4 of FIGURE 1;
FIGURE 5 is a sectional view taken on line 5—5 of FIGURE 1;
FIGURE 6 is a sectional view taken on line 6—6 of FIGURE 1;
FIGURES 7, 8, and 9 are diagrammatic elevational views showing the spray pattern produced by the spray unit as it dips down into a pan; and
FIGURE 10 is a diagrammatic plan view showing the spray pattern produced by the spray unit.

In the drawings, the lower body portion of a grease distributor head 10 is shown at 12, and projecting downwardly from body portion 12 is the spraying nozzle 14, the construction of which constitutes the subject matter of my invention.

The body portion 12 is provided with a bore forming an open ended grease chamber 16. A cylindrical shell 18, forming the upper portion of a nozzle 14, is removably secured to the lower end of the distributor head body portion 12 by any suitable means, as by a cap 22. The nozzle shell 18 is provided with an axially extending central bore 24 communicating at its lower end with a counterbore of larger diameter providing a central discharge opening 26. The bore 24 is of smaller diameter than the bore forming the cylindrical grease chamber 16 of the distributor head 10, and is arranged to accommodate a shaft 28 that is vertically slidable therein and projects upwardly into cylindrical grease chamber 16.

The lower end of the shaft 28 carries a nozzle head 30 of larger diameter than the diameter of shaft 28. The upper face of nozzle head 30, projecting radially outward of the shaft 28 and preferably sloping slightly downwardly therefrom forms a seat 32, arranged in one position of the nozzle head 30 to seat against a complementary seat 34 on the bottom face of nozzle shell 18 surrounding the discharge opening 25. The nozzle head 30 is normally retained in such seated engagement with nozzle shell 18 by means of a compression spring 36 about the shaft 28 intermediate the upper end of the nozzle shell 18 projecting inwardly of the grease chamber bore 16 of the distributor head body portion 12, and the shaft nut and lock nut means 38.

Extending through the length of the portion of the nozzle shell 18 projecting inwardly of the grease chamber bore 16 are a plurality, preferably two, passages 40 providing communication between grease chamber 16 and the discharge opening 26, as best shown in FIGURES 1, 3, and 4.

The nozzle head 30 is provided with a bottom open ended cylindrical cavity 42, and a Y-shaped port 44 provides communication between the discharge opening 26 of nozzle shell 18 and the cavity 42 of the nozzle head 30 for the passage of grease. The cavity 42 houses a ball check valve 46 controlling passage of grease through port 44, and is normally urged to closed position as hereinafter described.

A disk 48 is retained against the lower open end of the nozzle head 30 by a cap 50 threaded over the lower outside reduced portion of the nozzle head 30. The bottom wall of the cap 50 is provided with a downwardly flaring opening 52 registering with the cavity 42 of the nozzle head 30, and the disk 48 is provided with a grease discharge outlet 54, the diameter of which is substantially less than the diameter of the cap opening 52, so that the conically spreading spray of grease issuing from the discharge outlet 54 is not obstructed by the bottom of the cap 50.

Disposed within the cavity 42 is a core 56 having a plate-like portion 58, the perimetrical edge of which, except as hereinafter described, closely fits the inner side wall of the nozzle head 30 defining the cavity 42, whereby to retain the core 56 against lateral movement in the cavity 42. The plate-like portion 58 is provided with a centrally disposed restricted orifice 60 axially alined with outlet 54 in the disk 48 and of considerably smaller diameter, preferably about one-fourth the diameter of outlet 54. The core 56 is also formed with a central annular skirt 62, of smaller diameter than the diameter of cavity 42, depending from the bottom surface of the plate-like portion 58 adapted to rest on the disk 48 and forming therewith a shallow cylindrical inner whirl chamber 64 and an outer annular chamber 66. On its upper surface, the plate-like portion 58 of core 56 is provided with an upstanding spring retaining collar 68 for a spring 70 normally urging ball check valve 46 upwardly to close the Y-shaped port 44.

As before stated, the perimetrical edge of plate-like portion 58 does not closely fit the entire inner side wall of the nozzle head 30 defining the cavity 42, but as shown in FIGURE 5, it is provided with the diametrically opposed flats 72 forming restricted ports 74 providing communication between the cavity 42 and the annular chamber 66. The annular skirt 62 is provided with a pair of oppositely disposed offset passages 76, opening tangentially into chamber 64 and providing communication with annular chamber 66, as best shown in FIGURE 6.

Since bread pans are generally of considerably greater length than width it is preferred, in order to obtain the most effective spreading of grease over the inner side and bottom walls of the pans, to employ two distributor heads and nozzles 14 as shown in FIGURES 7-9. However, with some lessening degree of efficiency it will be apparent that a single distributor head and nozzle may be employed, and of course where the pans are more nearly square, only a single distributor head and nozzle would be employed. Also, in FIGURES 7-9, the nozzle is shown in conjunction with a distributor head that is arranged to dip down into the pan, however, since the means for moving the distributor head into and out of the pans is well known in the art, as shown in the above referred to Tench patents, and since such means constitutes no part of the present invention, it is not shown in the drawings nor herein described. While it is preferred to employ the nozzle of the present invention with a dipping type distributor head in order to obtain a more complete distribution of grease over the inner side walls of the pans, it is also adapted for advantageous use in connection with pan greasers, well known in the art, wherein the distributor head and nozzle are stationarily mounted above the level of the upper rim of the pan.

In FIGURE 1 the nozzle and distributor head are shown in normal relation when there is no pan beneath the nozzle, the chamber 16 and cavity 42 being filled with grease. When a pan is moved into position beneath the nozzle, a predetermined pressure is applied to the grease and a metered amount is arranged to be discharged from the nozzle. Again, the means for applying pressure to the grease when a pan registers with the nozzle, and the grease metering means are well known in the art so exemplified by the above referred to Tench patents and other patents, and since such means constitutes no part of the present invention, it has not been shown in the drawings nor described herein.

The compressibility of spring 70 is such as to yield against a lesser pressure than is required to move the nozzle head 30 downward against the force of spring 36, so that when pressure is applied to the grease in the chamber 16, ball check valve 46 will open, as shown in FIGURE 2. Pressure is thereupon transmitted to the grease in cavity 42, whereupon some of the grease is forced through the grease discharge orifice 60 in the core 56. Grease is also forced from cavity 42 through ports 74 into annular chamber 66, then through tangential passages 76 into chamber 64 and discharged through the grease discharge outlet 54 in the disk 48.

The tangential passages 76 impart a swirling motion of high velocity to the grease in the chamber 64, and centrifugal force as the grease is discharged through discharge outlet 54 causes the grease to be emitted in a spray of expanding conical band pattern, covering a wide band-like area of the bottom wall of the pan, indicated in FIGURE 10, by the reference character 78 between the broken lines 80 and 82. The grease discharged through the core orifice 60 would normally be in the form of a thin stream, with only a small spreading thereof being caused by the turbulence to the outer portion of the stream as its velocity is impeded by engagement with the edge of the core 56 defining the grease discharge orifice 60. However, due to the swirling motion of the grease discharged from chamber 64 through discharge outlet 54, surrounding the stream of grease issuing from the orifice 60, a swirling motion is imparted to the particles of grease of the stream issuing from the orifice 60 to effect a conical spreading pattern thereto, which upon striking the bottom of the pan fills in that portion 84 inside the band of grease 78. In this manner the entire surface of the bottom of the pan is coated with a thin spray of grease. With an oblong shaped pan of considerably greater length than width, it is preferable, as shown, to employ two grease nozzles.

The combined cross sectional area of the ports 74 and the orifice 60 is considerably smaller than the cross sectional area of ball check value controlled port 44, so that pressure of the grease in cavity 42 and chamber 16 will rapidly, almost instantaneously, increase to the predetermined pressure at which the nozzle head 30 moves downward against the force of spring 36 to the position shown in FIGURE 3.

Upon downward movement of the nozzle head 30, grease in addition to being discharged as above set forth to cover the bottom surface of the pan, is also deflected laterally and downwardly by the sloping seat 32, to be discharged between the surfaces of seats 32 and 34 in a conically spreading band against the inner side walls of the pan, and also the surface of the bottom of the pan not covered by the spray band 78. In FIGURE 3 the space between the surfaces of the seats 32 and 34 is greatly exaggerated in order to facilitate the placing of reference character lead lines.

In FIGURES 8, 9 and 10, the grease spray is more or less diagrammatically illustrated in connection with a nozzle of a pan greaser of the type shown in the above Tench patents wherein the nozzle is arranged to dip down in the cavities of successive pans as they are conveyed beneath the nozzles. However, it will be understood that the nozzle of the present invention is equally adapted for spreading grease over the inner side walls and bottom of the pan, wherein the nozzle is maintained in stationary position, just above the upper edge of the pan, in approximately the position shown in FIGURE 8.

I claim:

1. A grease spray unit for spraying grease over the upright inner wall surfaces and bottom wall surface of a bread pan comprising, a nozzle shell defining open ended passage means having an inlet for grease under pressure at its upper end and a grease outlet at its lower end, a nozzle head, said nozzle head having a stem guidingly supported for vertical movement in said nozzle shell, yieldable means cooperatively associated with said stem and nozzle shell for normally urging said nozzle head in abutting engagement with the lower end of said nozzle shell to form a closure for said grease outlet, said nozzle head being movable away from said nozzle shell in response to a predetermined grease pressure against the force of said yieldable means to form a laterally directed perimetrical continuous slot between the adjacent ends of said nozzle shell and nozzle head for emission therethrough of a laterally directed expanding band spray of grease, a cavity in said nozzle head, port means in said nozzle head providing communication between said nozzle shell outlet and said cavity, yieldable means in said cavity normally closing said port means arranged to open at a lesser pressure than the pressure required to unseat said nozzle head, and the lower end of said nozzle head having a central vertically directed restricted grease discharge opening adapted for the emission of a laterally expanding downwardly directed cone shaped spray of grease from said cavity.

2. A grease spray unit for spraying grease over the upright inner wall surfaces and bottom wall surface of a bread pan comprising, a nozzle shell defining open ended passage means having an outlet for grease under pressure at its upper end and a grease outlet at its lower end defined by an end wall surface, a nozzle head having an upper surface in confronting overlapping relation with said end wall surface and having a stem guidingly supported for vertical movement in said nozzle shell, yieldable means cooperatively associated with said stem and nozzle shell normally urging said nozzle head upwardly to effect engagement of said nozzle head upper surface with said nozzle shell end wall surface to form a closure for said grease outlet, said nozzle head being movable away from said nozzle shell in response to a predetermined grease pressure in said nozzle shell passage means against the force of said yieldable means to form a laterally opening annular slot between said confronting surfaces for emission therethrough of a laterally directed expanding band spray of grease, a cavity in said nozzle head, port means in soid nozzle head providing communication between said nozzle shell passage means and said nozzle head cavity, yieldable valve means in said cavity normally closing said port means arranged to open at a lesser pressure than the pressure required to unseat said nozzle head, and the lower end of said nozzle head having a central vertically directed restricted grease discharge opening for emission of a laterally expanding downwardly directed cone shaped spray of grease from said cavity.

3. A grease spray unit for spraying grease over the upright inner wall surfaces and bottom wall surface of a bread pan comprising, a nozzle shell defining open ended passage means having an inlet for grease under pressure at its upper end and a grease outlet at its lower end, a vertically movable nozzle head carried by said shell and yieldable means for normally urging said nozzle shell in abutting engagement with the lower end of said nozzle shell to form a closure for said grease outlet, said nozzle head being movable away from said nozzle shell in response to a predetermined grease pressure against the force of said yieldable means to form a laterally directed slot between the adjacent ends of said nozzle shell and nozzle head for emission of a laterally directed expanding band spray of grease, a grease cavity in said nozzle head, port means in said nozzle head providing communication between said nozzle shell outlet and said cavity, yieldable means in said cavity normally closing said port means arranged to open at a lesser pressure than the pressure required to unseat said nozzle head, a bottom end closure for said grease cavity having a central grease discharge opening, means in the lower end of said cavity forming a whirl chamber in surrounding communication with said grease discharge opening, passage forming means opening tangentially into said whirl chamber from said grease cavity for emission of an expanding conical band spray of grease through said discharge opening, and a restricted orifice in the upper end of said whirl chamber forming means axially alined with said grease discharge opening of substantially smaller cross sectional area than said grease discharge opening providing communication between said grease cavity and said whirl chamber for emission of an expanding spray of grease from said whirl chamber through said grease discharge opening within the confines of the band spray of grease issuing therefrom.

4. A grease spray unit in accordance with claim 3 wherein the combined cross sectional area of said tangential passage forming means and said restricted orifice is less than the cross sectional area of said port means.

5. A liquid grease spray nozzle comprising a body defining a bottom opening grease cavity and having an inlet for grease under pressure; a bottom end closure for said grease cavity having a control grease discharge opening; a core in said grease cavity supported on said end closure defining a shallow cylindrical whirl chamber in surrounding communication with said grease discharge opening; means forming restricted passages opening tangentially into said cylindrical whirl chamber providing communication between said grease cavity and said whirl chamber to impart a whirling motion to the grease in said whirl chamber for emission through said grease discharge opening in an annular conically expanding band; and a grease discharge orifice in the top wall of said whirl chamber of lesser diameter than the diameter of said grease discharge opening and axially alined therewith providing communication between said grease cavity and said whirl chamber for emission of grease under pressure in an extending spray centrally through the whirling grease in said whirl chamber.

6. A grease spray unit for spraying grease over the upright inner wall surfaces and bottom wall surface of a bread pan comprising, a nozzle shell defining open ended passage means having an inlet for grease under pressure at its upper end and a grease outlet at its lower end, a vertically movable nozzle head carried by said shell and yieldable means for normally urging said nozzle shell in abutting engagement with the lower end of said nozzle shell to form a closure for said grease outlet, said nozzle head being movable away from said nozzle shell in response to a predetermined grease pressure against the force of said yieldable means to form a laterally directed annular slot between the adjacent ends of said nozzle shell and nozzle head for emission of a laterally directed expanding band spray of grease, a grease cavity in said nozzle head, port means in said nozzle head providing communication between said nozzle shell outlet and said cavity, yieldable means in said cavity normally closing said port means arranged to open at a lesser pressure than the pressure required to unseat said nozzle head, a bottom end closure for said grease cavity having a central grease discharge opening, a core in said grease cavity supported on said end closure defining a shallow cylindrical whirl chamber surrounding said grease discharge opening, means forming restricted passages opening tangentially into said whirl chamber and communicating with said grease cavity to impart a whirling motion to the grease in said whirl chamber for emission through said grease discharge opening in an annular conically expanding band, and a grease discharge orifice in the top wall of said whirl chamber of lesser cross sectional area than said grease discharge opening axially alined with said grease discharge opening for emission of grease under pressure centrally through the whirling grease in said whirl chamber.

References Cited in the file of this patent

UNITED STATES PATENTS

| 2,569,033 | Wise | Sept. 25, 1951 |
| 2,605,142 | Gold et al. | July 29, 1952 |
| 2,697,636 | Hahn | Dec. 21, 1954 |

FOREIGN PATENTS

| 285,673 | Switzerland | Jan. 5, 1953 |